United States Patent
Ramachandra Iyer et al.

(10) Patent No.: US 11,151,326 B2
(45) Date of Patent: Oct. 19, 2021

(54) METHODS AND SYSTEMS OF INTERCHANGING CODE-MIXED WORDS AND UNI-LANGUAGE WORDS

(71) Applicant: Wipro Limited, Bangalore (IN)

(72) Inventors: Manjunath Ramachandra Iyer, Bangalore (IN); Boby Chaitanya Villari, Bengaluru (IN)

(73) Assignee: Wipro Limited, Bangalore (IN)

(*) Notice: Subject to any disclaimer, the term of this patent is extended or adjusted under 35 U.S.C. 154(b) by 308 days.

(21) Appl. No.: 16/365,714

(22) Filed: Mar. 27, 2019

(65) Prior Publication Data
US 2020/0257765 A1    Aug. 13, 2020

(30) Foreign Application Priority Data
Feb. 13, 2019   (IN) .............................. 201941005720

(51) Int. Cl.
| | | |
|---|---|---|
| *G06F 40/30* | (2020.01) | |
| *G06F 40/279* | (2020.01) | |
| *G06F 40/44* | (2020.01) | |
| *G06F 40/263* | (2020.01) | |
| *G06F 40/253* | (2020.01) | |

(52) U.S. Cl.
CPC ............ *G06F 40/30* (2020.01); *G06F 40/263* (2020.01); *G06F 40/279* (2020.01); *G06F 40/44* (2020.01); *G06F 40/253* (2020.01)

(58) Field of Classification Search
CPC ........ G06F 40/30; G06F 40/279; G06F 40/44; G06F 40/263; G06F 40/253

USPC ........................................................... 704/2
See application file for complete search history.

(56) References Cited

U.S. PATENT DOCUMENTS

| | | | |
|---|---|---|---|
| 8,838,431 B1* | 9/2014 | Mihalache | G06F 30/33 703/15 |
| 2003/0028364 A1* | 2/2003 | Chan | G06F 8/33 704/1 |

(Continued)

OTHER PUBLICATIONS

Gupta, D., Tripathi, S., Ekbal, A., & Bhattacharyya, P. (2016). A hybrid approach for entity extraction in code-mixed social media data. MONEY, 25, 66.*

(Continued)

*Primary Examiner* — Edwin S Leland, III
(74) *Attorney, Agent, or Firm* — Finnegan, Henderson, Farabow, Garrett & Dunner, LLP

(57) ABSTRACT

A method and a systems of interchanging code-mixed words and uni-language words are described. In an embodiment, the method may include identifying two or more portions of a target word, wherein the target word is one of a code-mixed word and a uni-language word. The method may further include determining one or more equivalent words corresponding to at least one portion of the two or more portions, wherein the one or more equivalent words are in at least one predetermined target language. The method may further include selecting at least one equivalent word from the one or more equivalent words, based on a context of the target word within a sentence comprising the target word. The method may further include replacing the at least one portion of the two or more portions of the target word with the selected at least one equivalent word.

18 Claims, 6 Drawing Sheets

(56) References Cited

U.S. PATENT DOCUMENTS

| | | | | |
|---|---|---|---|---|
| 2005/0125218 | A1* | 6/2005 | Rajput | G06F 40/279 |
| | | | | 704/8 |
| 2009/0319496 | A1* | 12/2009 | Warren | G06F 16/2452 |
| 2016/0042359 | A1* | 2/2016 | Singh | G06F 40/58 |
| | | | | 704/2 |
| 2019/0197119 | A1* | 6/2019 | Zhang | G06F 40/58 |
| 2020/0257765 | A1* | 8/2020 | Ramachandra Iyer | |
| | | | | G06F 40/263 |

OTHER PUBLICATIONS

Bhat, I. A., Bhat, R. A., Shrivastava, M., & Sharma, D. M. (2018). Universal dependency parsing for hindi-english code-switching. arXiv preprint arXiv: 1804.05868.*

Barman, U., et al., "Code Mixing: A Challenge for Language Identification in the Language of Social Media" Proceedings of the the First Workshop on Computational Approaches to Code Switching, 2014, pp. 13-23.

Das, A., et al., "Code-Mixing in Social Media Test: The Last Language Identification Frontier?", TAL vol. 54—No. 3, 2013, pp. 44-64.

* cited by examiner

Table 1

| Root word | Second phoneme 'ed' | Usage probability |
|---|---|---|
| See | Seeed | 0.001 |
| Watch | Watched | 0.98 |

Table 2

| A | B | C | D |
|---|---|---|---|
| John | 1 | | |
| John | is | 0.7 | |
| John | is | eat | 0.8 |
| John | is | ate | 0.07 |

FIG. 5

METHODS AND SYSTEMS OF INTERCHANGING CODE-MIXED WORDS AND UNI-LANGUAGE WORDS

TECHNICAL FIELD

This disclosure relates generally to language translation, and more particularly to a method and device for interchanging code-mixed words and uni-language words.

BACKGROUND

Various text-based mediums of conversing and expressing oneself have come up recently. These text-based mediums may include text messaging applications, such as WhatsApp™, Short Messaging Service (SMS), and blogging. It is commonly observed that a user (a blogger or a sender of a text message) may deviate from using typical words of a language, and may instead start using customized words. These customized words may include code-mixed words, which are a combination of two or more words belonging to different languages. For example, a user may type a French sentence: "il est assis tranquillement" which means "He is sitting quietly" in English. In some cases, instead of using the word "tranquillement", a user may use the word "tranquily" which is code-mixed word formed using a first portion "tranquil" from French Language (i.e. the word "tranquillement") and a second portion "ly" from English Language. The user may do this for various reasons, such as shorter size, non-availability of a word (to the user) in English, free flow of thoughts in native language, bonding or socializing in local language, or ease of typing. However, such a code-mixed word may not always be understood by another user (for example, a receiver of the text message, or a reader of the blog), especially when the other user does not understand one of the language used in creating the code-mixed word.

Some language translation applications are available which may be used with the text-based messaging applications or blogging websites, that may translate the words or sentences from its original language to a language that the receiver/reader is able to understand. However, these language translation applications may be able to translate only typical words of one language to another language, but are not able to translate the code-mixed words. Further, some translation applications may use one or more Natural Language Processing (NLP) techniques for translating code-mixing at sentence-level. However, these techniques are not effective with code-mixing at word-level.

SUMMARY

In one embodiment, a method of interchanging code-mixed words and uni-language words is disclosed. The method may include identifying two or more portions of a target word, wherein the target word may be one of a code-mixed word and a uni-language word. The method may further include determining one or more equivalent words corresponding to at least one portion of the two or more portions. The one or more equivalent words may be in at least one predetermined target language. The method may further include selecting at least one equivalent word from the one or more equivalent words, based on a context of the target word within a sentence including the target word. The method may further include replacing the at least one portion of the two or more portions of the target word with the selected at least one equivalent word.

In another embodiment, a translation device for interchanging code-mixed words and uni-language words is disclosed. The translation device may include a processor and a memory communicatively coupled to the processor. The memory stores processor instructions, which, on execution, cause the processor to identify two or more portions of a target word, wherein the target word is one of a code-mixed word and a uni-language word. The processor instructions further cause the processor to determine one or more equivalent words corresponding to at least one portion of the two or more portions, wherein the one or more equivalent words are in at least one predetermined target language. The processor instructions further cause the processor to select at least one equivalent word from the one or more equivalent words, based on a context of the target word within a sentence comprising the target word. The processor instructions further cause the processor to replace the at least one portion of the two or more portions of the target word with the selected at least one equivalent word.

In yet another embodiment, a non-transitory computer-readable storage medium is disclosed. The non-transitory computer-readable storage medium has instructions stored thereon, a set of computer-executable instructions causing a computer comprising one or more processors to perform steps comprising identifying two or more portions of a target word, wherein the target word is one of a code-mixed word and a uni-language word, determining one or more equivalent words corresponding to at least one portion of the two or more portions, wherein the one or more equivalent words are in at least one predetermined target language, selecting at least one equivalent word from the one or more equivalent words, based on a context of the target word within a sentence comprising the target word, and replacing the at least one portion of the two or more portions of the target word with the selected at least one equivalent word.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrate tables that include exemplary probability calculation for each of the one or more equivalent words, in accordance with yet another exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
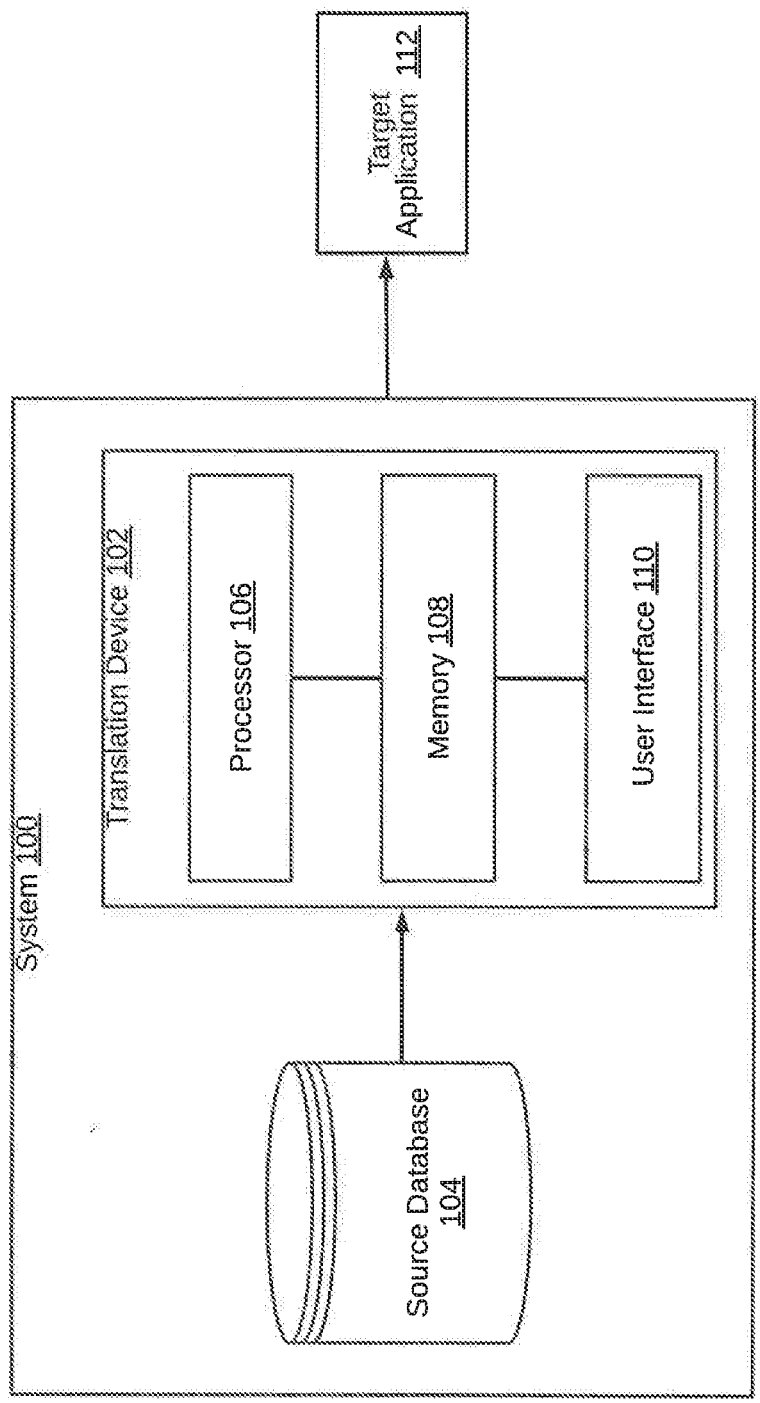
FIG. 1 is a block diagram illustrating a system for interchanging code-mixed words and uni-language words, in accordance with an embodiment.

In one embodiment, a system 100 for interchanging code-mixed words and uni-language words is illustrated in the FIG. 1, in accordance with an embodiment. The system 100 may include a translation device 102 and a source database 104. The translation device 102 may be a computing device that has document processing capability. Examples of the translation device 102 may include but are not limited to, server, desktop, laptop, notebook, netbook, tablet, smartphone, mobile phone, application server, server, or the like.

The translation device 102 may interchange code-mixed words and uni-language words. By way of an example, the translation device 102 may interchange the code-mixed words into uni-language words, or the uni-language words into code-mixed words for a text-based application. The text-based application may be a text messaging application or a blogging application. The translation device 102 may receive input data including the code-mixed words and uni-language words from the source database 104. To this end, the translation device 102 may be communicatively coupled to the source database 104. Further, in some embodiments, the translation device 102 may be communicatively coupled to a target application 112 running the text-based application. The source database 104 may include various sources from which structured and unstructured data may be extracted. By way of an example, the source database 104 may include a Relational Database Management System (RDBMS) from which structured data may be extracted. By way of another example, the source database 104 may include website data, machine generated data, and word documents from which unstructured data may be extracted, As will be described in greater detail in conjunction with FIG. 2 to FIG. 5, in order to interchange code-mixed words and uni-language words, the translation device 102 may identify two or more portions of a target word. The target word may be one of a code-mixed word and a uni-language word. The translation device 102 may further determine one or more equivalent words corresponding to at least one portion of the two or more portions. The one or more equivalent words may be in a predetermined target language. The translation device 102 may further select at least one equivalent word from the one or more equivalent words, based on a context of the target word within a sentence comprising the target word. The translation device 102 may further replace the at least one portion of the two or more portions of the target word with the selected equivalent word.

In order to perform the above discussed functionalities, the translation device 102 may include a processor 106 and a memory 108. The memory 108 may store instructions that, when executed by the processor 106, cause the processor 106 to interchange code-mixed words and uni-language words, as discussed in greater detail in FIG. 2 to FIG. 5. The memory 108 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM). The memory 108 may also store various data (e.g., input data (code-mixed word and uni-language word data)), text-based application data, translation data, ending phoneme data, target language data, computation data, probability data, training data, etc.) that may be captured, processed, and/or required by the system 100.

The translation device 102 may further include a user interface 110 through which the translation device 102 may interact with a user and vice versa. By way of an example, the user interface 110 may be used to display results of an analysis performed by the translation device 102 to the user. By way of another example, the user interface 110 may be used by the user to provide inputs to the translation device 102.

The system 100 may interact with one or more external devices (not shown in FIG. 1) over a communication network (not shown in FIG. 1) for sending or receiving various data. Examples of the one or more external devices may include but are not limited to a remote server, a digital device, or another computing system. The communication network may be a wired or a wireless network and the examples may include but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
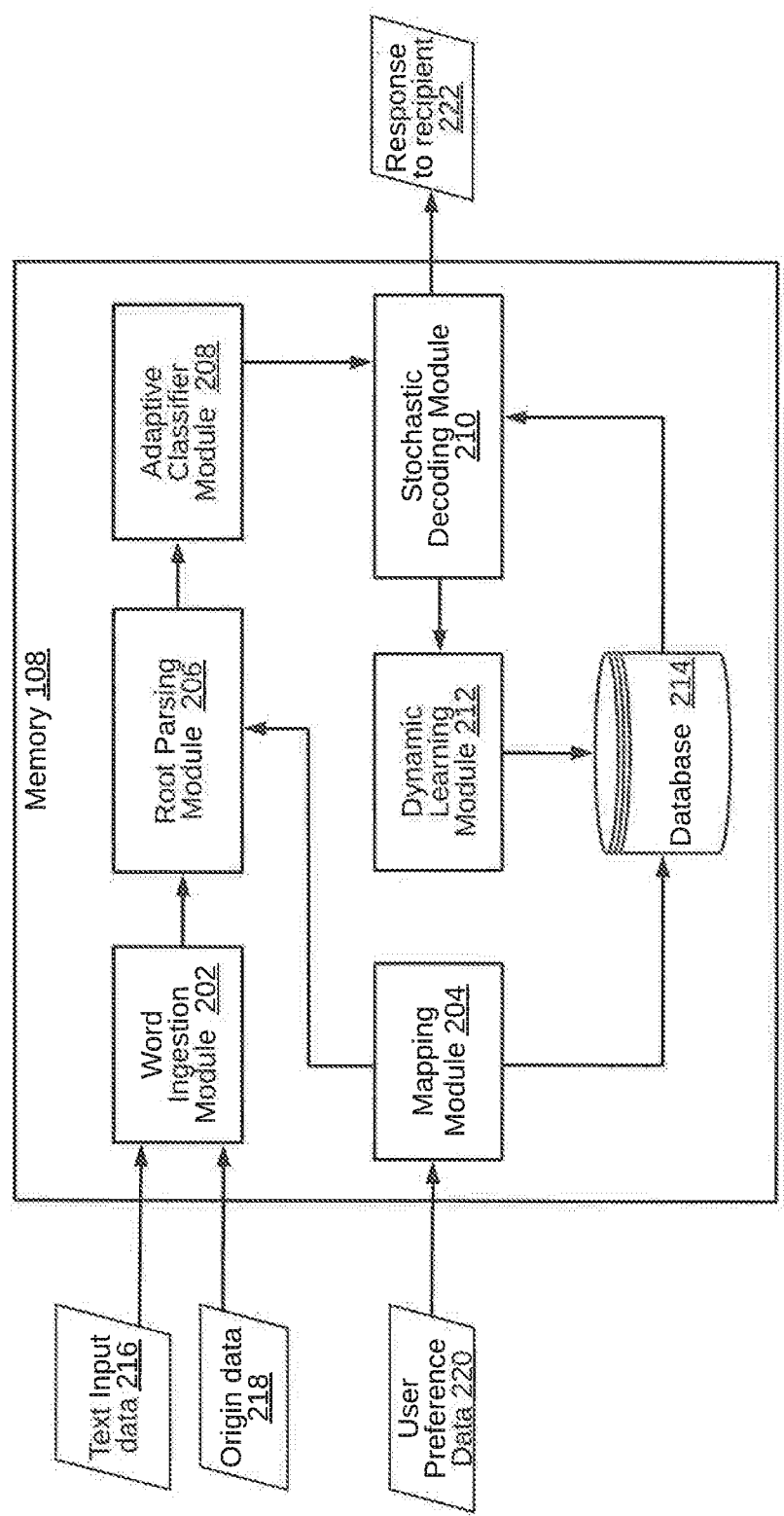
FIG. 2 illustrates a block diagram of a memory of a translation device configured to interchange code-mixed words and uni-language words, in accordance with an embodiment.

Referring now to FIG. 2, a functional block diagram of the memory 108 within the translation device 102 configured to interchange code-mixed words and uni-language words is illustrated, in accordance with an embodiment. The memory 108 may include modules that may perform various functions so as to interchange the code-mixed words and the uni-language words for a text-based application. The memory 108 may include a word ingestion module 202, a mapping module 204, a root parsing module 206, an adaptive classifier module 208, a stochastic decoding module 210, a dynamic learning module 212, and a database 214. As will be appreciated by those skilled in the art, all such aforementioned modules and databases 202-214 may be represented as a single module or a combination of different modules. Moreover, as will be appreciated by those skilled in the art, each of the modules and databases 202-214 may reside, in whole or in parts, on one device or multiple devices in communication with each other.

In some embodiments, the word ingestion module 202 may receive a text input data 216. The text input data 216 may include one or more target words. It may be noted that each target word may include one of a code-mixed word and a uni-language word, It may be understood that the code mixed word may include two or more words with phonemes of two or more languages. By way of an example, the text input data 216 may be associated with a text message sent from a sender device. The word ingestion module 202 may further receive origin data 218. The origin data 218 may indicate whether the text input data 216 may have originated from the sender device, or from another device, for example, a recipient device—in response to a message from the sender device. In some embodiments, the text input data 216 may be assigned values, based on the origin data 218. For example, the text input data 216 originating from the sender device may be assigned a value "1", and the text input data 216 originating from the receiver device may be assigned a value "0". Based on the assigned values, the word ingestion module 202 may check if the text input data 216 is generated by the sender device or has been received by the sender device. It may be noted that the sender device may generate the text input as a part of an outgoing message from the sender device. In such a case, if the target word does not belong to one of the one or more languages agreed by the receiver at the time of start of communication, an alert message may be generated to the sender device.

The mapping module 204 may be communicatively coupled to the database 214. The mapping module 204 may receive user preference data 220, and store the received user preference data 220 in the database 214. The user preference data 220 may include language preferences of the sender and the receiver. By way of an example, the user preference data 220 may be collected at the time of installation of the text messaging application, or at the time of initiating the text messaging application for starting a conversation. It may be noted that the target word may be translated only upon identifying a common language from the language preferences of the sender and the receiver. As mentioned earlier, when no common language could be identified, an alert may be sent to the sender.

The root parsing module 206 may be communicatively coupled to the word ingestion module 202 and the mapping module 204. The root parsing module 206 may receive the target word (for e.g. code-mixed word) from the word ingestion module 202, and the user preference data 220 from the mapping module 204. The root parsing module 206 may identify two or more portions of the target word. For example, the root parsing module 206 may identify the two or more portions by identifying a boundary between the constituent portions of the target word.

The adaptive classifier module 208 may be communicatively coupled to the root parsing module 206 and may receive the two or more portions identified by the root parsing module 206. Upon receiving the two or more portions, the adaptive classifier module 208 may generate one or more equivalent words corresponding to at least one portion of the two or more portions. It may be noted that the one or more equivalent words are in at least one predetermined target language. For example, the adaptive classifier module 208 may generate one or more uni-language words as one or more equivalent words corresponding to at least one portion of the two or more portions of a code-mixed word. Alternatively, the adaptive classifier module 208 may generate one or more code-mixed words as one or more equivalent words corresponding to at least one portion of the two or more portions of a uni-language word. In other words, the adaptive classifier module 208 may interchange the code-mixed words and equivalent words of uni-language words.

The stochastic decoding module 210 may be communicatively coupled to the adaptive classifier module 208 and may receive the one or more equivalent words of the target word from the adaptive classifier module 208. Upon receiving the one or more equivalent words, the adaptive classifier module 208 may select at least one equivalent word from the one or more equivalent words. In some embodiments, the stochastic decoding module 210 may select the at least one equivalent word based on a context of the target word within a sentence comprising the target word. Further, in some embodiments, the stochastic decoding module 210 may select the at least one equivalent word based on one or more probability scores. The stochastic decoding module 210 may further replace the at least one portion of the two or more portions of the target word with the selected at least one equivalent word. In some embodiment, upon replacing, the stochastic decoding module 210 may further generate one of a response or a message indicating the replacement (for example, response to a recipient 222).

The dynamic learning module 212 may be communicatively coupled to the stochastic decoding module 210 and may receive the one of a response or a message generated by the stochastic decoding module 210. The dynamic learning module 212 may store the replacing word (i.e. the selected equivalent word) in a database 214. Further, the dynamic learning module 212 may learn the replacing of the at least one portion of the two or more portions of the target word with the selected equivalent word. For example, based on the learning, the dynamic learning module 212 may be able to directly replace the target word with an equivalent word. In some embodiments, the stochastic decoding module 210 may retrieve the replacing word (i.e. the selected equivalent word) from the database 214, to directly replace the target word. The dynamic learning module 212 may further replace the target word based on a conversation flow, for example, in a text message conversation.

Figure 3:
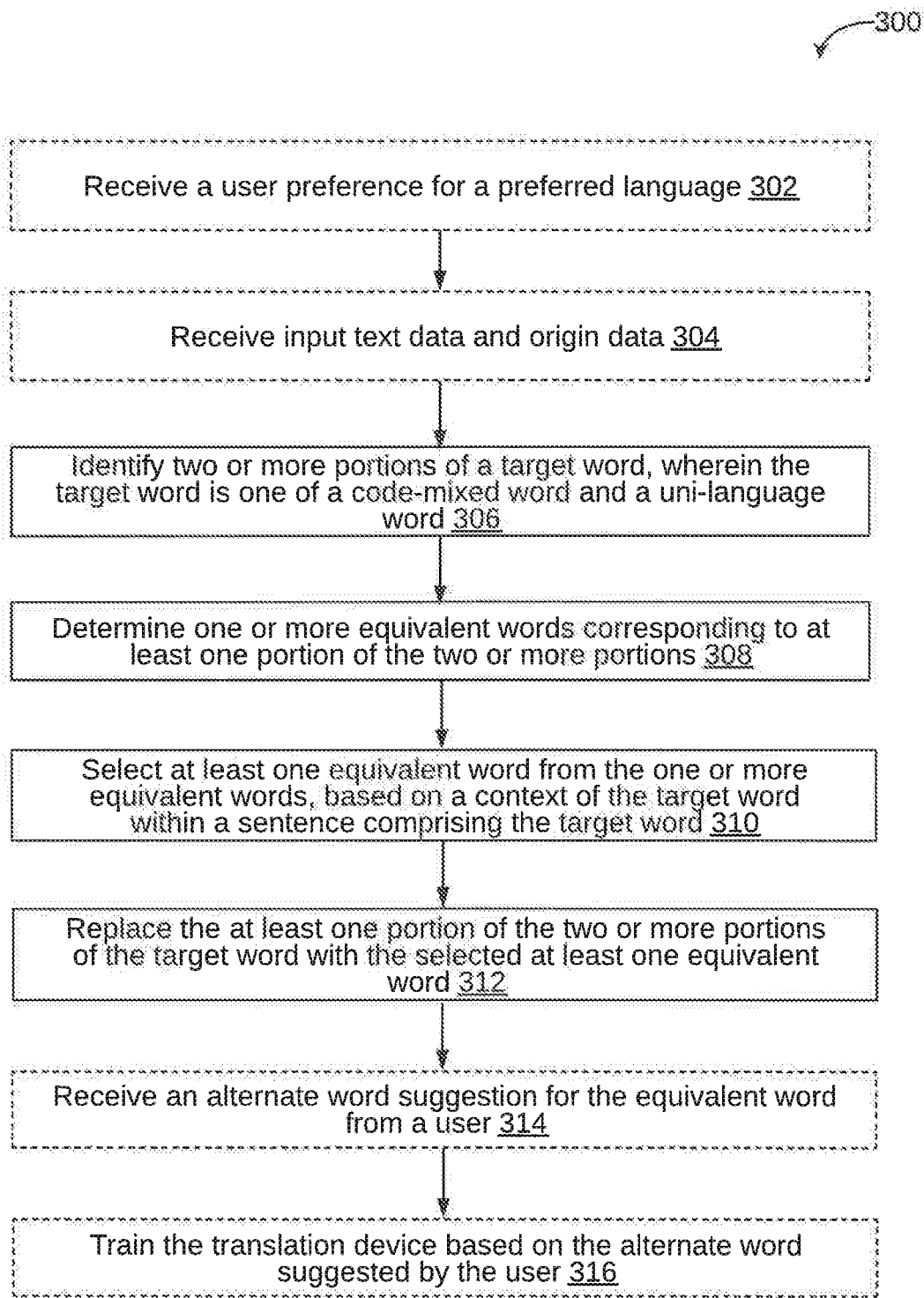
FIG. 3 illustrates a flowchart of a method of interchanging code-mixed words and uni-language words, in accordance with an embodiment.

Referring now to FIG. 3, a flowchart 300 of a method for interchanging code-mixed words and uni-language words is illustrated, in accordance with an embodiment. In some embodiments, the method for interchanging code-mixed words and uni-language words may be used in association with a text messaging application.

At step 306, two or more portions of a target word may be identified. It may be noted that the target word may include one of the code-mixed word and the uni-language word. At step 308, one or more equivalent words corresponding to at least one portion of the two or more portions may be determined. It may be noted that the one or more equivalent words are in at least one predetermined target language. At step 310, at least one equivalent word may be selected from the one or more equivalent words, based on a context of the target word within a sentence comprising the target word, At step 312, the at least one portion of the two or more portions of the target word may be replaced with the selected at least one equivalent word. Additionally, at step 302, a user preference for a preferred language may be received, and at step 304, text input data 216 and origin data 218 may be received. At step 314, an alternate word suggestion may be received for the equivalent word from a user, At step 316, the translation device 102 may be trained based on the alternate word suggested by the user.

At step 302, user preference data 220 may be received. In some embodiments, the user preference data 220 may be received by a mapping module 204 of the translation device 102. In some embodiments, in relation to a text messaging application, the user preference data 220 may include a language preference of a sender and a receiver of text message. It may be noted that the user preference data 220 may be received at the time of installing the text messaging application on a user device, or at the time of the user initiating the text messaging application on the user device. Upon receiving the user preference data 220, the user preference data 220 may be sent to a receiver device of a receiver of the text message, for example, at the time of initiating the text messaging application on the sender device. By way of an example, the user preference data 220 may be sent to the receiver device after the sender has typed the receiver address on the sender device, and before the sender has sent the message (i.e. pressed the "send" button). Further, at step 302, a matching of language preferences of the receiver and that of the sender may be performed, to identify a common language among the language preferences of the receiver and the sender. Upon identifying the common language, the receiver device and the sender device may be notified about the common language, for example, via a popup.

It may be noted that a text message conversation between the sender and the receiver may be initiated after identifying a common language. It may be further noted that when there are two or more receivers, the text message conversation may be initiated upon identifying a common language between the sender and each of the two or more receivers. In scenarios, when a common language could not be identified, the sender may be informed about the same, and about avoiding using code-mixed words.

At step 304, the text input data 216 and the origin data 218 may be received. In some embodiments, the text input data 216 and the message origin data 218 may be received by the word ingestion module 202. The text input data 216 may include one or more target word. The target word may be one of a code-mixed word and a uni-language word. The origin data 218 may include information about origin of the text input data 216. For example, the information may indicate whether the text message originated as a part of the sender message or any other source. In some embodiments, if the message originating as a part of the sender message includes a code-mixed word having phonemes belonging to a language other than the common language, an alert may be generated to the sender, At step 306, two or more portions of a target word may be identified. In some embodiments, the two or more portions of a target word may be identified by a root parsing module 206. As mentioned earlier, the target word may be a part of the text message to be sent from the sender device to the receiver device. In some embodiments, at least one portion of the two or more portions may be an ending phoneme corresponding to a verb, for example, "ing". Similarly, the at least one portion of the two or more portions may be an ending phoneme corresponding to an adverb, for example, "ly". By way of an example, for a code-mixed word "tranquily" (from French word "tranquillement""), two portions "tranqui" and "ly" may be identified, upon identifying the English language ending phoneme "ly". In some embodiments, a list of ending phonemes corresponding to a verb or an adverb may be created in a database 214.

In some embodiments, the two or more portions may be identified using a bidirectional Long Short Term Memory (LSTM). As will be appreciated, an LSTM may use both a forward parser and a backward parser. The forward parser of the LSTM may parse the code-mixed words in the forward direction, and the backward parser of the LSTM may read in the reverse direction. For example, the backward parser may read the ending phoneme "ing" as "gni". Upon, parsing, the LSTM may apply parsing rules to identify the two or more portions. In some embodiments, a table may be created of ending phonemes for each of the forward parser and the backward parser of the LSTM. Further, based on the table, prefix and suffix combinations may be obtained using the bidirectional LSTM. Upon identifying the two or more portions, each of the portions may be looked for in the respective languages. It may be noted that, if the target word is already a uni-language word, only one portion may be detected i.e. that uni-language word itself.

At step 308, one or more equivalent words may be determined corresponding to at least one portion of the two or more portions. The one or more equivalent words may be in at least one predetermined target language. In some embodiments, the one or more equivalent words may be determined by an adaptive classifier module 208. In some embodiments, a derivative word may be identified for a portion of the two or more portions, for which the one or more equivalent words may be determined. It may be noted that the derivative word may be in a native language associated with the portion. By way of an example, in a code-mixed word "dekhing" (which may be created from the word "dekh" of Hindi (native) language (which means "look" in the English language), and the word "ing" of English language) includes a portion "dekh". A derivative word identified for the portion "dekh" may be "dekhna". Once the derivative word is identified, one or more equivalent words for the derivative word may be identified. For example, one or more equivalent words identified for the above derivative word "dekhna" are determined, which include "seeing", "sawing", and "seening".

At step 310, at least one equivalent word may be selected from the one or more equivalent words. The at least one equivalent word may be selected based on a context of the target word within a sentence comprising the target word. The method of selecting the at least one equivalent word from the one or more equivalent words is further explained in detail, in conjunction with FIG. 4, At step 312, the at least one portion of the two or more portions of the target word may be replaced with the selected at least one equivalent word. It may be understood that by way of replacing one portion of the target word with the selected at least one equivalent word, the entire target word may be replaced i.e. a new word may replace the target word. For example, a code-mixed word may be replaced by a uni-language word, or a uni-language word may be replaced by a code-mixed word. It may be noted that when replacing the target word, the sequence of the words in the sentence, in which the target word is replaced, may remain the same as before. For example, a sentence "il est assis tranquily", upon replacing of the target word "tranquily" may become "il est assis tranquillement". Apparently, the target (code-mixed) word "tranquily" is replaced by a uni-language word "tranquillement", although the sequence of the words in the sentence remains same.

At step 314, an alternate word suggestion may be received for the selected equivalent word from a user. It may be noted that in some cases, the user (for example, a receiver of the text message including a code-mixed word) may not be able to follow the selected equivalent word (uni-language word) of the target word (code-mixed word). In such cases, the user may ask the sender of the message to explain the selected equivalent word. The sender may then provide an alternate word suggestion, This alternate word suggestion may be a manually translated word for the target word. For example, if the receiver is not able to follow a code-mixed word "deking" or the selected equivalent word, the sender may provide an alternate word suggestion as "watching".

At step 316, the translation device 102 may be trained based on the alternate word suggested by the user. In other words, the alternate word suggestion may be added to a database 214. Accordingly, in the future, a word "dekh" may automatically be decoded as "watch", and hence, a code-mixed word, such as "dekhing" may automatically be decoded as "watching"

Figure 4:
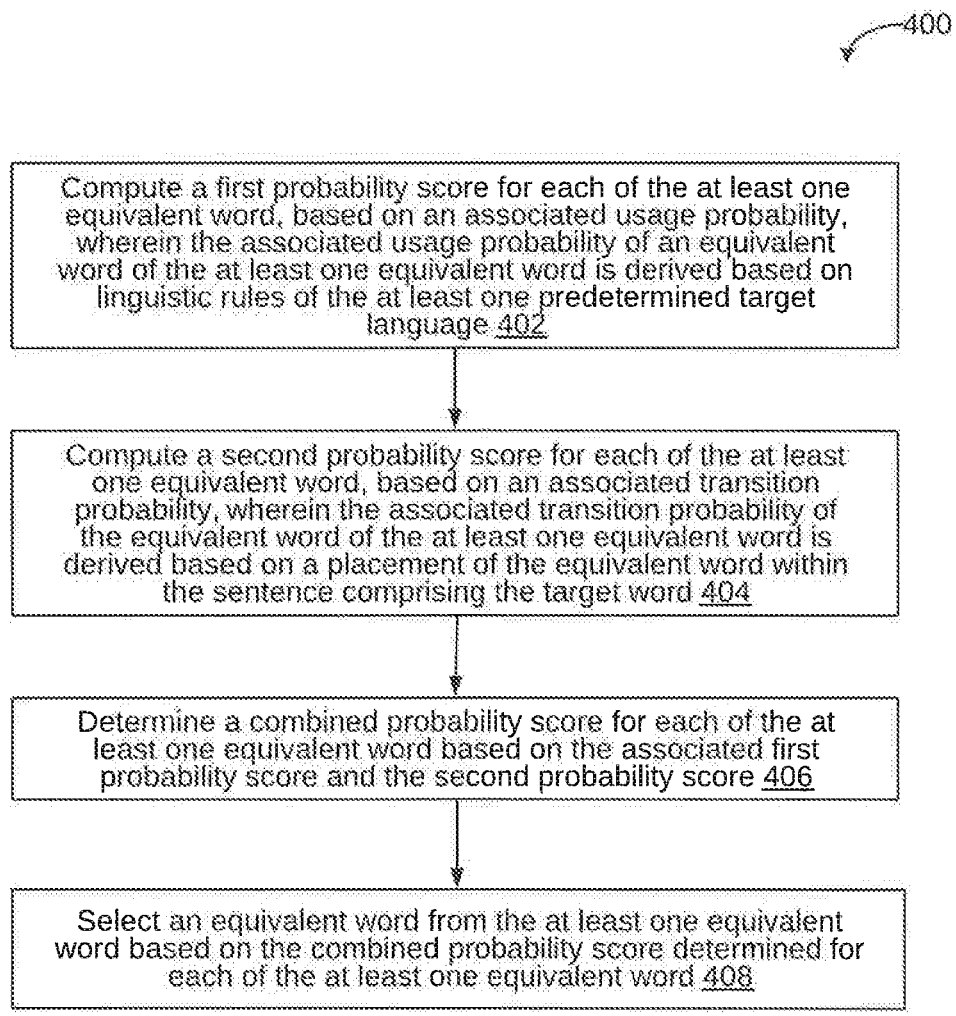
FIG. 4 illustrates a flowchart of a method for selecting an equivalent word from the at least one equivalent word is illustrated, in accordance with an embodiment.

Referring now to FIG. 4, a flowchart 400 of a method for selecting an equivalent word from at least one equivalent word is illustrated, in accordance with an embodiment. At step 402, a first probability score may be computed for each of the at least one equivalent word, based on an associated usage probability. The associated usage probability of an equivalent word of the at least one equivalent word may be derived based on linguistic rules of at least one predetermined target language. For example, associated usage probability may be derived based on grammatical rules of the at least one predetermined target language. In other words, the associated usage probability may be based on the usage of each of the identified one or more equivalent words.

By way of an example, the code-mixed word "dekhed" has a root word "dekh" and an ending phoneme verb "ed", The equivalent words identified for the root word may include "see" and "watch", which when used with the ending phoneme are "seeed", and "watched". Based on the associated usage probability, a computed first probability score for "seeed" and "watched" is computed. The usage probability is shown in Table 1 of FIG. 5. As shown in the Table 1, the usage probability for "watched" (0.98) is higher than that of "seeed" (0.001). Therefore, "watched" may be a more appropriate equivalent word.

At step 404, a second probability score may be computed for each of the at least one equivalent word, based on an associated transition probability. The associated transition probability of the equivalent word of the at least one equivalent word may be derived based on a placement of the equivalent word within the sentence comprising the target word. In some embodiments, Markov model may be used to compute the transition probability of the equivalent word. Further, in some embodiments, the Markov model may be used to compute the transition probability of a derived word of the target word, based on the placement of the target word, In some embodiments, the transition probability may be computed based on training over the English language. Further, in some embodiments, an LSTM neural network may be used to compute the transition probability.

By way of an example, in the sentence "John is khaing pizza" (meaning "John is eating Pizza" in the English language), the word "khaing" is a code-mixed word, having the portions "kha" and "ing". The one or more equivalent words determined for the portion "kha" may include "eat" and "ate". Accordingly, a second probability score for each of "eat" and "ate" may be computed, based on the position of the "khaing" (target word) with respect to the adjoining words "John" and "is".

At step 406, a combined probability score may be computed for each of the at least one equivalent word based on the associated first probability score and the second probability score. In some embodiments, the combined probability score may be determined by multiplying the associated first probability score and the second probability score. An exemplary calculation of the combined probability score for each of the equivalent words of the above examples is shown in shown in Table 2 of FIG. 5. As shown in the Table 2, the combined probability of the equivalent words "eat" and "ate" in the sentence "John is khaing pizza" is 0.8 and 0.07. It may be noted that, probability of "eat" and "ate" after the word "is" in a sentence may be computed to be "0.3" and "0.01". However, the combined probability, computed after taking into consideration conditional probabilities of other words in the sentence, may turn out to be different, as shown in Table 2 of FIG. 5.

At step 408, an equivalent word may be selected from the at least one equivalent word based on the combined probability score determined for each of the at least one equivalent word. In the above example, as the combined probability score of the equivalent word "eat" is more (0.8 and 0.07) than that of the equivalent word "ate", the equivalent word "eat" may be selected.

Some use case scenarios of the above disclosure are discussed below:

Use Case Scenario 1:

John is sending a message to his father over a text messaging application, such as a live chat. In due course of time, John starts using code-mixed words in his messages, as he is more comfortable and fluent in his native language. However, his father faces difficulty in understanding some of the code-mixed words that John is typing in his messages. John's father further observes that asking John to explain the code-mixed words makes the interaction even slower. He invokes the translation device 102, as described in the various embodiments discussed above. As a result, John's father starts receiving uni-language (English) words for the code-mixed words. Therefore, John's messages become comprehensible to his father, and at the same time, John is able to type in his natural style.

Use Case Scenario 2:

Tom has a query with a bank over bank deposit. He initiates a chat with customer care system. John starts typing using code-mixed words created from English language and Hindi language. For example, Tom types a message "I jamaed Rs 1000. shrey?" The translation device 102 as described in the various embodiments discussed above, allows the customer care system to understand the message as "I deposited Rs1000. Credited?", as the code-mixed word "jamaed" means "deposit'ed", and the word 'shrey' (Hindi word written in English) means "credited". The customer care system is, therefore, able to understand Tom's query and respond back accordingly.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
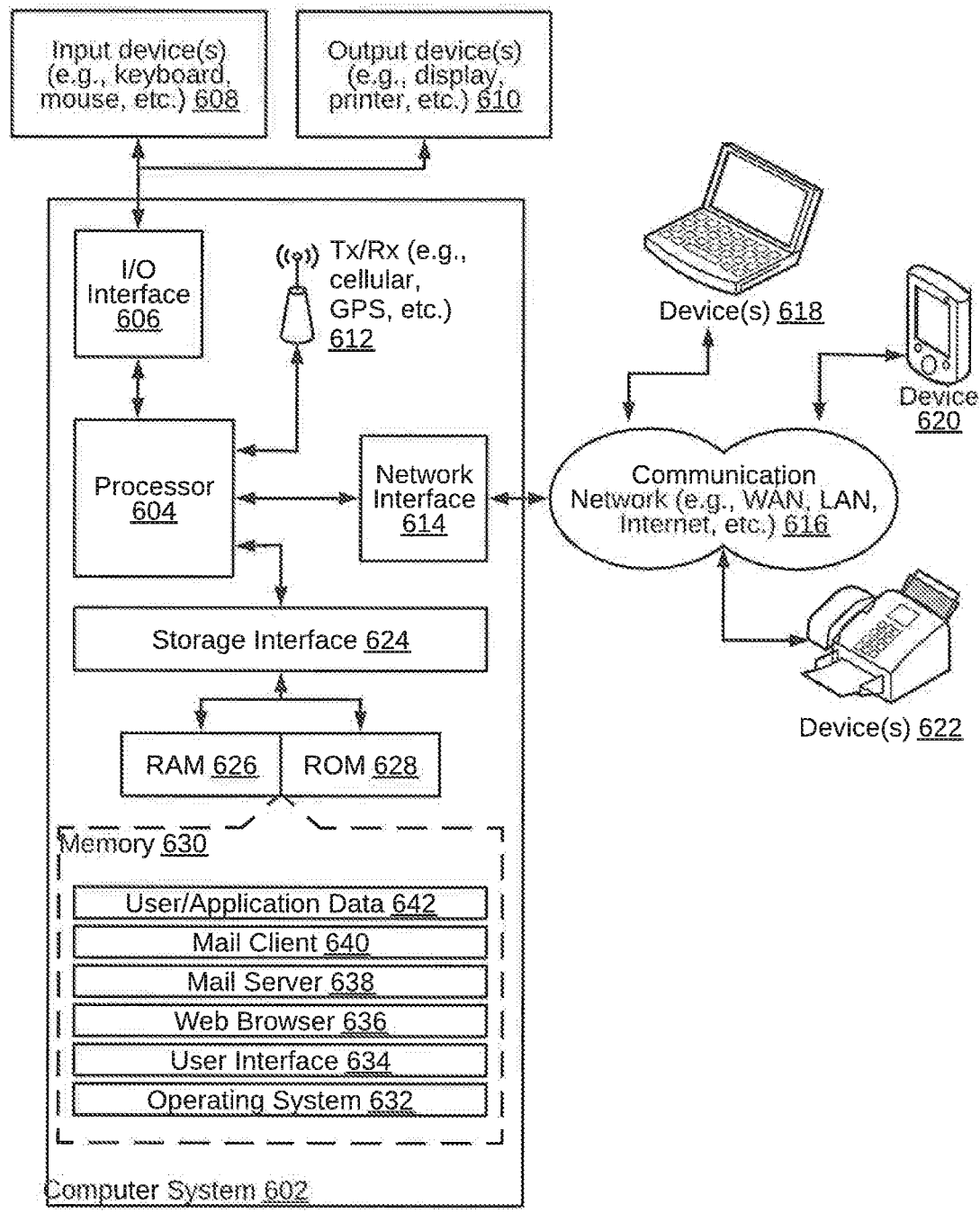
FIG. 6 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 602 for implementing various embodiments is illustrated. Computer system 602 may include a central processing unit ("CPU" or "processor") 604. The processor 604 may include at least one data processor for executing program components for executing user or system-generated requests. A user may include a person, a person using a device such as those included in this disclosure, or such a device itself. The processor 604 may include specialized processing units such as integrated system (bus) controllers, memory management control units, floating point units, graphics processing units, digital signal processing units, etc. The processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. The processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 604 may be disposed in communication with one or more input/output (I/O) devices via an I/O interface 606. The I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA. IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 606, the computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with the processor 604. The transceiver 612 may facilitate various types of wireless transmission or reception. For example, the transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPAMSUPA communications, etc.

In some embodiments, the processor 604 may be disposed in communication with a communication network 616 via a network interface 614. The network interface 616 may communicate with the communication network 616. The network interface 614 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. The communication network 616 may include, without limitation, a direct interconnection, local area network (LAN), wide area network (WAN), wireless network (for example, using Wireless Application Protocol), the Internet, etc. Using the network interface 614 and the communication network 616, the computer system 602 may communicate with devices 618, 620, and 622. These devices 618, 620, and 622 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 602 may itself embody one or more of these devices 618, 620, and 622.

In some embodiments, the processor 604 may be disposed in communication with one or more memory devices (for example, RAM 626, ROM 628, etc.) via a storage interface 624. The storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 630 may store a collection of, program or database components, including, without limitation, an operating system 632, user interface application 634, web browser 636, mail server 638, mail client 640, user/application data 642 (for example, any data variables or data records discussed in this disclosure), etc. The operating system 632 may facilitate resource management and operation of the computer system 602. Examples of the operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 634 may facilitate display, execution, interaction, manipulation, or operation of program components through textual or graphical facilities. For example, the user interface 634 may provide computer interaction interface elements on a display system operatively connected to the computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 602 may implement a web browser 636 stored program component. The web browser 636 may be a hypertext viewing application, such as MICROSOFT® INTERNET EXPLORER® web browser, GOOGLE® CHROME web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. The web browsers 636 may utilize facilities such as AJAX, DHTML, ADOBE® FLASH® platform, JAVASCRIPT® programming language, JAVA® programming language, application programming interfaces (APis), etc. In some embodiments, the computer system 602 may implement a mail server 638 stored program component. The mail server 638 may be an Internet mail server such as MICROSOFT® EXCHANGE® mail server, or the like. The mail server 638 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. The mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 602 may implement a mail client 640 stored program component. The mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are, only to be seen as references to suitable means for providing the described functionality, rather than indicative of a strict logical or physical structure or organization.

As will be appreciated by those skilled in the art, the techniques described in the various embodiments discussed above pertain to interchanging code-mixed words and uni-language words. The techniques employ neural network technologies, such as long short-term memory (LSTM) for translating a code-mixed word into a uni-language word, and vice versa. For example, the techniques may help in deciphering a code-mixed word used by a sender of a text message that a receiver is unable to understand, by providing an equivalent word. The techniques may further help in reducing overall bandwidth consumed during transmission of text messages. By providing an automatic transition of a word, without interrupting a user, the techniques further allow a free flow of thoughts in the native language of the user. Further, the techniques also allow chatbots and trained FAQ systems to understand the text expressions of the user, thereby helping the user interact in their natural style. As the techniques are learning-based, the techniques are also able to provide auto-filling of the code-mixed words, once the system is trained on the user's style of code-mixed words. Further, when a sender creates code-mixed words using a different language other than a naïve language or creates its own vocabulary, the techniques provide for generating an alert to the receiver of the message, thereby preventing inconvenience to the receiver.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of interchanging code-mixed words and uni-language words, the method comprising:
    identifying, by a translation device, two or more portions of a target word, wherein the target word is one of a code-mixed word and a uni-language word;
    determining, by the translation device, one or more equivalent words corresponding to at least one portion of the two or more portions, wherein the one or more equivalent words are in at least one predetermined target language, wherein determining the one or more equivalent words comprises identifying a derivative word for a portion of the at least one portion to be replaced, and wherein the derivative word is in a native language associated with the portion;
    selecting, by the translation device, at least one equivalent word from the one or more equivalent words, based on a context of the target word within a sentence comprising the target word; and
    replacing, by the translation device, the at least one portion of the two or more portions of the target word with the selected at least one equivalent word.

2. The method of claim 1, wherein at least one remaining portion of the two or more portions is an ending phoneme corresponding to a verb.

3. The method of claim 2, wherein the at least one predetermined target language is determined based on the at least one portion that is an ending phoneme.

4. The method of claim 1, wherein the two or more portions are identified using a bidirectional Long Short Term Memory (LSTM).

5. The method of claim 1, wherein the at least one predetermined target language corresponds to a user preference.

6. The method of claim 1, wherein selecting the at least one equivalent word comprises identifying the at least one equivalent word associated with the derivative word.

7. The method of claim 6 further comprising:
computing a first probability score for each of the at least one equivalent word, based on an associated usage probability, wherein the associated usage probability of an equivalent word of the at least one equivalent word is derived based on linguistic rules of the at least one predetermined target language; and
computing a second probability score for each of the at least one equivalent word, based on an associated transition probability, wherein the associated transition probability of the equivalent word of the at least one equivalent word is derived based on a placement of the equivalent word within the sentence comprising the target word.

8. The method of claim 7 further comprising:
determining a combined probability score for each of the at least one equivalent word based on the associated first probability score and the second probability score; and
selecting an equivalent word from the at least one equivalent word based on the combined probability score determined for each of the at least one equivalent word.

9. The method of claim 8 further comprising:
receiving an alternate word suggestion for the equivalent word from a user; and
training the translation device based on the alternate word suggested by the user.

10. A translation device for interchanging code-mixed words and uni-language words, the translation device comprising:
a processor; and
a memory communicatively coupled to the processor, wherein the memory stores processor instructions, which, on execution, causes the processor to:
identify two or more portions of a target word, wherein the target word is one of a code-mixed word and a uni-language word;
determine one or more equivalent words corresponding to at least one portion of the two or more portions, wherein the one or more equivalent words are in at least one predetermined target language, wherein determining the one or more equivalent words comprises identifying a derivative word for a portion of the at least one portion to be replaced, and wherein the derivative word is in a native language associated with the portion;
select at least one equivalent word from the one or more equivalent words, based on a context of the target word within a sentence comprising the target word; and
replace the at least one portion of the two or more portions of the target word with the selected at least one equivalent word.

11. The translation device of claim 10, wherein at least one remaining portion of the two or more portions is an ending phoneme corresponding to a verb, and wherein the at least one predetermined target language is determined based on the at least one portion that is an ending phoneme.

12. The translation device of claim 10, wherein the two or more portions are identified using a bidirectional Long Short Term Memory (LSTM).

13. The translation device of claim 10, wherein the at least one predetermined target language corresponds to a user preference.

14. The translation device of claim 10, wherein selecting the at least one equivalent word comprises identifying the at least one equivalent word associated with the derivative word.

15. The translation device of claim 14, wherein the processor instructions further cause the processor to:
compute a first probability score for each of the at least one equivalent word, based on an associated usage probability, wherein the associated usage probability of an equivalent word of the at least one equivalent word is derived based on linguistic rules of the at least one predetermined target language; and
compute a second probability score for each of the at least one equivalent word, based on an associated transition probability, wherein the associated transition probability of the equivalent word of the at least one equivalent word is derived based on a placement of the equivalent word within the sentence comprising the target word.

16. The translation device of claim 15, wherein the processor instructions further cause the processor to:
determine a combined probability score for each of the at least one equivalent word based on the associated first probability score and the second probability score; and
select an equivalent word from the at least one equivalent word based on the combined probability score determined for each of the at least one equivalent word.

17. The translation device of claim 16, wherein the processor instructions further cause the processor to:
receive an alternate word suggestion for the equivalent word from a user; and
train the translation device based on the alternate word suggested by the user.

18. A non-transitory computer-readable storage medium having stored thereon, a set of computer-executable instructions causing a computer comprising one or more processors to perform steps comprising:
identifying two or more portions of a target word, wherein the target word is one of a code-mixed word and a uni-language word;
determining one or more equivalent words corresponding to at least one portion of the two or more portions, wherein the one or more equivalent words are in at least one predetermined target language, wherein determining the one or more equivalent words comprises identifying a derivative word for a portion of the at least one portion to be replaced, and wherein the derivative word is in a native language associated with the portion;
selecting at least one equivalent word from the one or more equivalent words, based on a context of the target word within a sentence comprising the target word; and
replacing the at least one portion of the two or more portions of the target word with the selected at least one equivalent word.

* * * * *